(12) United States Patent  (10) Patent No.: US 6,209,344 B1
Mahajan  (45) Date of Patent: Apr. 3, 2001

(54) MULTI-WALLED CONTAINER

(76) Inventor: Gautam K. Mahajan, Surya Plaza, K-185, Sarai Julena - First Floor, New Delhi, 110 025 (IN)

( * ) Notice: Subject to any disclaimer, the term of this patent is extended or adjusted under 35 U.S.C. 154(b) by 0 days.

(21) Appl. No.: 09/281,911

(22) Filed: Mar. 31, 1999

Related U.S. Application Data

(60) Provisional application No. 60/080,219, filed on Mar. 31, 1998.

(51) Int. Cl.[7] .................................................. F25D 3/08
(52) U.S. Cl. ................................. 62/457.3; 62/371
(58) Field of Search .................... 62/457.3, 530, 62/371; 220/582.16, 582.28, 582.26, 582.2

(56) References Cited

U.S. PATENT DOCUMENTS

| | | | |
|---|---|---|---|
| 3,715,895 | * | 2/1973 | Devlin ..................................... 62/457 |
| 3,726,106 | * | 4/1973 | Jaeger et al. ........................ 62/371 X |
| 4,117,951 | * | 10/1978 | Winckler ............................... 220/461 |
| 4,215,798 | * | 8/1980 | Patterson et al. ..................... 220/421 |
| 4,646,925 | * | 3/1987 | Nohara .................................. 215/1 C |
| 4,743,479 | * | 5/1988 | Nakamura et al. ............... 220/453 X |
| 4,933,040 | * | 6/1990 | Wesley .................................. 220/3 X |
| 5,137,179 | * | 8/1992 | Stoffel ............................... 220/364 X |
| 5,329,778 | * | 7/1994 | Padamsee ........................... 62/530 X |
| 5,388,716 | * | 2/1995 | Stoffel et al. ........................ 220/404 |
| 5,464,106 | * | 11/1995 | Slat et al. .......................... 220/454 X |
| 5,931,334 | * | 8/1999 | Sartore ............................. 220/592.16 |

* cited by examiner

Primary Examiner—Corrine McDermott
Assistant Examiner—Chen Wen Jiang
(74) Attorney, Agent, or Firm—William H. Holt

(57) ABSTRACT

A preform and a blow molded container formed therefrom and having plural cavities or compartments for providing enhanced properties including vacuum containers for hot and cold product, or barrier materials including gases or layered material, improved creep resistance, use of lower cost and/or recycled materials, increased wall strength and aerosol properties.

2 Claims, 3 Drawing Sheets

MULTI-WALLED CONTAINER

This application claims the benefit of U.S. Provisional Application Ser. No. 60/080,219 filed on Mar. 31, 1998.

This invention relates to a new and improved container and more particularly to a blow molded bottle, or container, and including either narrow or wide mouths for receiving or dispensing product, the container having outer walls and an inner wall for providing at least two compartments separate from each other and each being capable of containing various liquids, solids and/or gases for purposes that will be hereinafter explained in further detail.

BACKGROUND OF THE PRIOR ART

Bottles or containers having a plurality of compartments are known in the prior art. Probably the best known of these devices is the one referred to as a vacuum bottle which was introduced with the trademark name of "Thermos® (brand) bottle". Such bottles or containers were, and are, well known for keeping beverages or food products, such as thin liquids including but not limited to water, tea, coffee and the like, or thicker liquids such as soups, stews and the like, either hot or cold, by providing a vacuum within the outer one of the two compartments to thereby facilitate regulation of the temperature of product within the inner container by restricting heat transfer either to or from the inner compartment, so that cold products remain cold and hot products remain hot for reasonable periods of time.

SUMMARY OF THE INVENTION

The present invention provides a novel product comprised of a bottle, or similar type of container, having at least a double walled body portion which provides a container having inner and outer compartments adapted for the following objects and uses of the invention:

1. The outside compartment can contain a pressured fluid for forcing fluid product out from the inner compartment through a dispenser, such as a valve dispenser.
2. The novel container is useful for containing and dispensing products such as, for example, toothpaste, sauces, seasonings, food toppings, decorative material, beverages, gels, aerosols, and a wide range of similar products.
3. The inner and outer compartments may contain different types of segregated fluids, pastes, and the like, that need to be mixed just prior to use such as, for example, multi-component epoxy resins, glues, adhesives and hardeners. Provision can be made to allow combining separated materials to be combined and mixed within the container by rupturing the inner wall prior to the mixed product being dispensed from the container.
4. Keeping fluids cold by putting a fluid in the outer cavity and freezing, or cooling it to keep fluid in the central cavity cold, or cool.
5. Keeping liquids hot, in a similar fashion, such as by microwave heating of liquid in the outer cavity to heat fluid in the inner cavity.
6. Putting a moisture scavenger/desiccant in the outer compartment for reducing moisture entry into the inner compartment.
7. Putting an oxygen scavenger and an inert gas, such as nitrogen, in the outer compartment to reduce ingress of oxygen into the inner compartment.
8. Putting chemicals, etc., in the outer compartment so that diffusion of similar products from the inside to the outside is reduced if the concentration of the chemical in the outer compartment is equal to that of the concentration in the inner compartment; diffusion from the inner to the outer compartment will only occur when the chemicals in the outer compartment start to diffuse outwardly. Thus, this will result in a reduction of the chemical concentration loss of the inner compartment.
9. In the case of hot fills and heat setting, hot fluids, with or without pressure, can be introduced into one or both compartments.
10. The side walls of the inner compartment can be made very thin and allow for collapse during emptying of the inner container. The walls may also be a barrier material or a multilayer laminate.
11. The outside layer may be very thin and can be a barrier material, and may likewise be multilayered.
12. Either, or both, walls can be a barrier, or multilayered laminates.
13. The inside walls may be fashioned with ribs (similar to the Supa base inventions), thus providing rigidity and allowing the average thickness of the walls to be reduced in thickness.
14. The bottom of the outer wall can be formed to be self-supporting as taught by my issued U.S. Pat. Nos. 5,400,911; or 5,611,988; and made from a preform in accord with U.S. Pat. No. 5,792,563 to provide a stable supporting surface.

DESCRIPTION OF THE PREFERRED EMBODIMENTS

Polyester bottles are made by a one-step process, or a two step process wherein a preform is made in a known manner during a first operation and then a bottle, or other shape of container, is formed during a stretch, blow molding operation.

In extrusion blow molding, an air gap can be introduced by eliminating one layer and pushing air through the space. Otherwise, two extrudates can be formed by putting one inside of the other. Conventional blow molding machines can be used but with a plurality of two or more blow pins.

Figure 1:
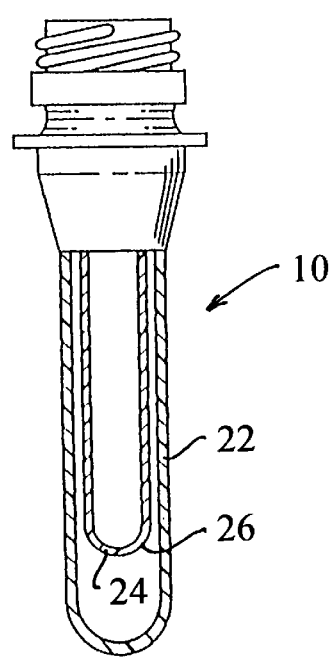
FIG. 1 is an elevational view of a preform shown partly in section.
Figure 2:
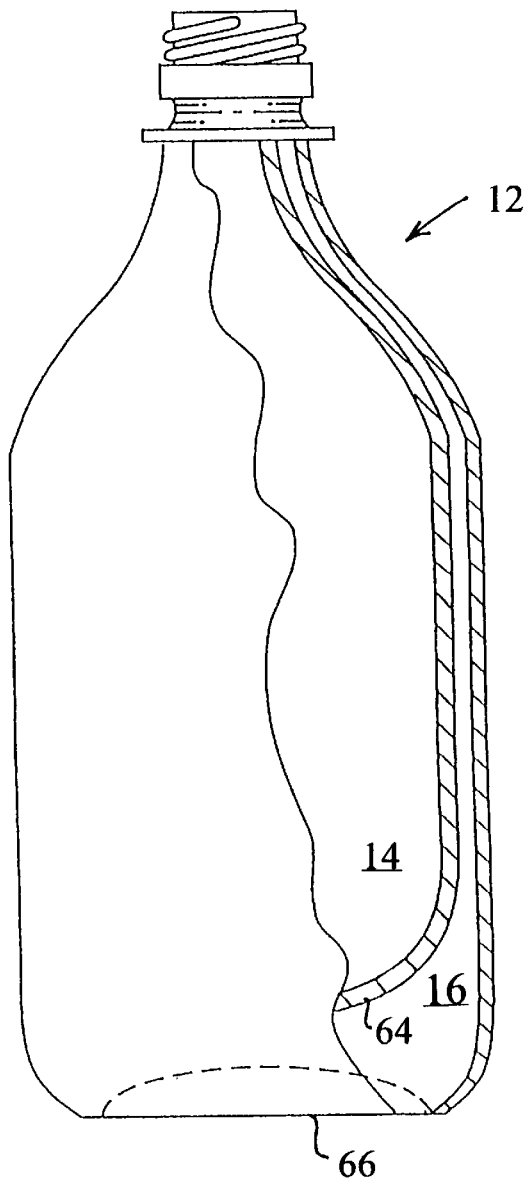
FIG. 2 is a fragmentary, vertical sectional view of a container showing a double walled container formed from the preform of FIG. 1 and having inner and outer cavities.
Figure 4:
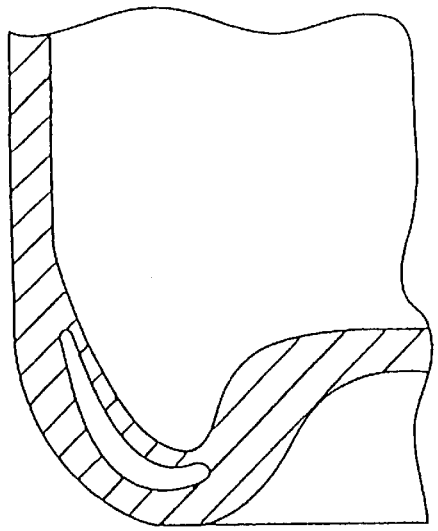
FIG. 4 is a fragmentary, sectional view of a preform and shows a prior art type of air gap in a container bottom, known from my U.S. Pat. No. 4,403,706.
Figure 3:
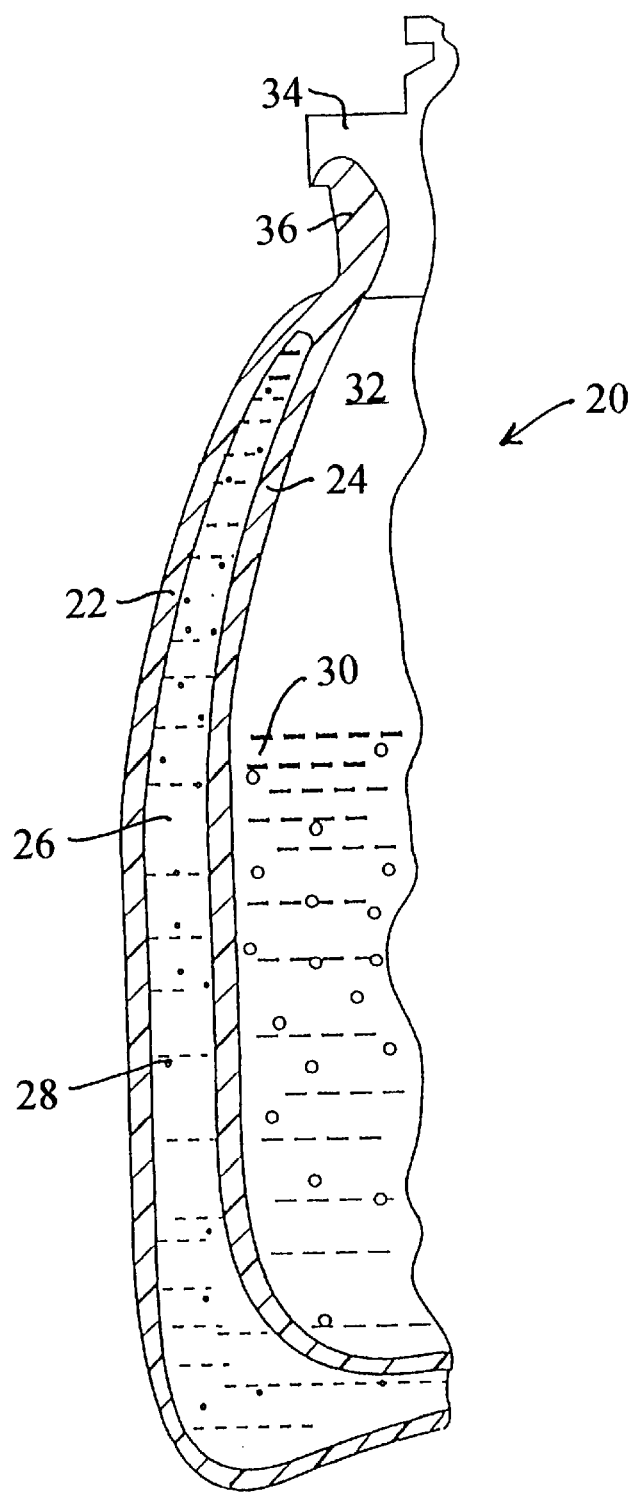
FIG. 3 is a fragmentary, sectional view of a container similar to the container of FIG. 2 and shows a portion of a valve type closure useful for dispensing pressurized product.

This invention describes a novel, one-piece bottle formed from a preform, shown in FIG. 1 and generally indicated by the numeral 10. The bottle, shown in FIG. 2, and generally indicated by the numeral 12, includes at least two compartments, or cavities, an inner compartment 14 and an outer compartment 16, and is intended to satisfy the needs of those containers requiring a plurality of compartments such as in Thermos® flasks, refrigerated bottles where refrigerant is introduced in the outer cavity 16, and for aerosol containers having propellant in one compartment 16 and product in a second cavity or compartment 14. It is to be understood that the bottle or container 12 may have the shape as shown in FIGS. 2 or 3, but can also be formed, as is referred to in the trade, as being a wide mouth jar, or the like. An aerosol bottle, shown in FIG. 3 and generally indicated by the numeral 20, can be formed in a conventional pressure mold so that the exterior has the shape of a conventional bottle and by sequentially, or simultaneously, blowing the inner wall 24, a gap or outer compartment 26 is maintained between the inner and outer walls. The blowing may be done through a plurality of blow pins at one end of the bottle, or blow pins may be used at the top and bottom portions.

Figure 6:
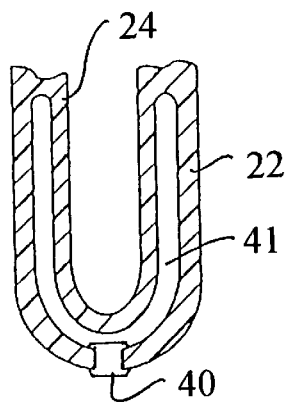
FIG. 6 is a fragmentary, sectional view of a preform and shows a grommet for introducing pressure into the outer cavity of the container to be formed therefrom.

Propellant, indicated at 28, can be introduced in the outer compartment 26 for forcing product 30 from the inner cavity or compartment 32 out through a conventional valve 34. The inner wall 24 can be formed of a very thin wall that will be collapsible in the fashion of a thin walled plastic bag. The valve 34 can be is used at the upper finish 36 as is shown in FIG. 3, and pressure can be introduced during a filling operation by using a grommet 40, as shown in FIG. 6. It is also possible to use the blowing air to provide pressure on the product 30 if the blowing air is not evacuated. Alternatively, the outer compartment 26 can remain pressurized by the blowing gases; in this case the product 30 will have to be filled under pressure. Product 30 can also be filled under normal pressure if the outer cavity 26 is pressurized after the product is inserted.

Barrier properties of the polymers can be quite important. For example, oxygen ingress into many foods and vegetables causes deterioration of food quality. This can be avoided, or reduced, using the double walled container of the present invention, by introducing nitrogen or other gases 28 into, for example, the outer cavity or compartment 26 to protect the product 30 thereby avoiding or reducing passage of oxygen.

Further, the walls 22 and 24 can be laminated with inner and outer layers (not shown) which can be made of different materials to provide required properties at reduced cost. For example, the inside layer may be made of PEN or a high mixture of PEN and PET, or of PET and EVOH while the outside layer can be PET.

The invention provides a method of making a bottle, or other form of container, having an inside cavity or compartment 14 and an outside cavity or compartment 16 to provide a two component bottle at considerably lower cost. Only one set of tooling is required and the bottle preform 10 is made in a simple forming step (rather than one step for the inside cavity and a second step for the outer cavity).

Figure 10:
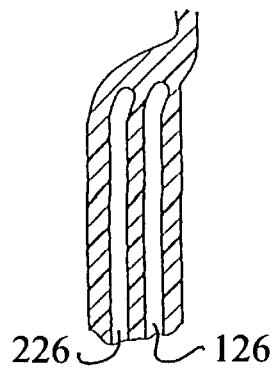
FIG. 10 is a fragmentary, sectional view of a preform for producing a multi-walled container which will have walls of varying thickness.

A multi-walled bottle will have a thickness equal to the thickness of the walls plus the thickness of the intermediate air gap 26, or gaps 126 and 226, such as in FIG. 10. This can be advantageous by providing higher side wall strength, resulting from the plurality of walls, rather than conventional single-walled containers containing the same amount of material.

Figure 7:
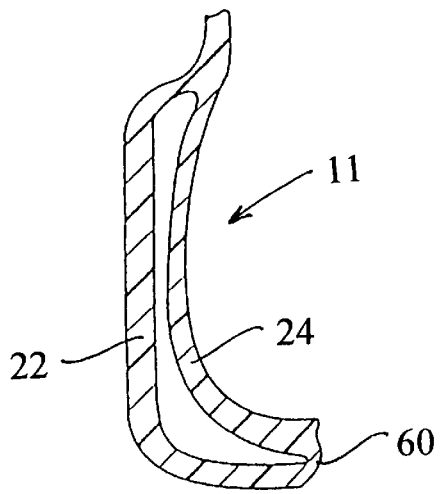
FIG. 7 is a fragmentary, sectional view of a preform wherein the inner and outer walls are attached at the bottom portion.
Figure 8:
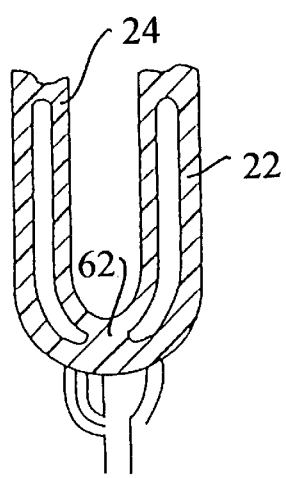
FIG. 8 is a fragmentary, sectional view of a preform and shows lines for injecting air, or other fluid, into the bottom during a blow molding operation.

The bottom of a finished container, similar to containers 12 or 20, by utilizing a preform as shown in FIGS. 7 and 8, can be joined as shown at 60 or 62 to thereby strengthen the bottom walls of the resulting container.

The invention very nicely allows for the use of a combination of differing materials. For example, see FIG. 5 wherein one wall 124 may be a high barrier material. An outer wall 122 which is not in contact with the product may be a cheaper material, or recycled material that is not permitted to be used in contact with food products.

The invention further allows for containing a refrigerant or coolant fluid, such as shown at 28, in the outer cavity or compartment 26 in FIG. 3 and freezing or chilling it to thereby provide a cooling effect for the product 30.

If hot filling of product is required or desired, coolant can be introduced between the inner and outer compartments so that all of the resulting vacuum and consequent deformation of the container is taken by the inner container 24 so that the outside wall 22 does not creep and maintains a desired configuration. Coolant introduced in this manner acts as a heat sink for protecting not only the outer wall but also minimizing deformation of the inner wall.

Barrier properties are improved by the present invention because of the gap or spacing between the walls; gas that is to escape, or ingress, must go through multiple interfaces thus slowing or stopping transmission of the gas.

Use of a proper gas within the gap 26 between walls can enhance the barrier effect. If, for example, carbon dioxide is in the inside cavity or compartment and also in the outside cavity or compartment, the potential to drive carbon dioxide from the inside cavity to the outside cavity will not exist, or would be diminished.

If a vacuum is drawn in the outer cavity 26, a plastic vacuum bottle is thus formed by a simple manufacturing process.

The inside cavity 14 can be protected from the ambient atmosphere by providing a protective atmosphere in the outside cavity 16.

As is shown in FIG. 2, the inside cavity 14 can have a hemisphere base 64 which is best for containing pressure, while the outside base 66 can be formed as a pressure base.

Containers formed in accordance with this invention provide or allow for improved forming operations such as in a blow molding operation. A cold fluid may be introduced into the hollow space of the outer compartment during the blow molding operation. The cycle time, or cooling time, can be substantially reduced. Assume, for example, that the inner and outer compartments divide the side walls into equal portions; then, the cooling time for these sections is reduced by a factor of four, because the thickness of the walls may be only 50% of the current conventional thickness. This assumes that infinite heat transfer to the cooling medium is achieved.

Figure 5:
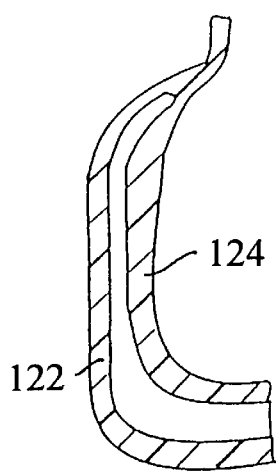
FIG. 5 is a fragmentary, sectional view of a preform and shows one form of preform having an air gap between inner and outer walls.

FIGS. 5–10 show various shapes and construction of preforms, the advantages of which will be readily apparent to those skilled in the art. Thus FIG. 5 shows a preform in which the inner and outer walls 122 and 124 are of differing thicknesses and may be of different types or grades of thermoplastic material.

FIG. 6, as previously described contains a grommet 40 which may be of soft metal such as aluminum, or resilient rubber that can be perforated, and self-sealing, during a filling operation during which gas, or liquid material can be introduced into the space 41 between the outer wall 22 and the inner wall 24. Wall 24 may be rupturable, such as by providing a weakened portion (not shown), to provide for mixing of separate products contained within the inner and outer compartments.

FIG. 7 shows the outer wall 22 and the inner wall 24 joined at 60 to provide a strengthened, or less flexible bottom. FIG. 8 is a somewhat schematic showing of valving for introducing fluids into the inner and outer compartments joined together at juncture 62.

Figure 9:
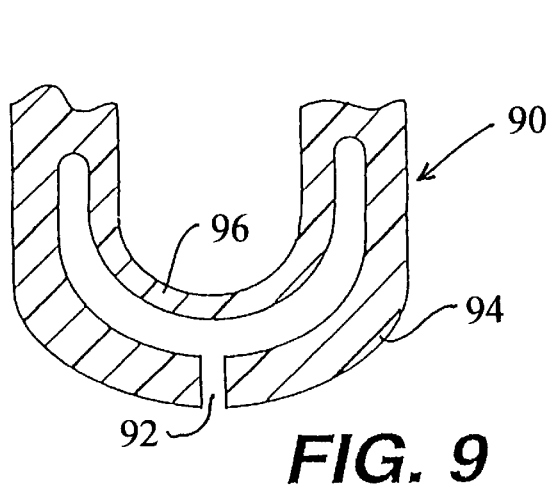
FIG. 9 is a fragmentary, sectional view of a preform and shows an opening in the bottom for receiving a blow rod.

FIG. 9 illustrates a preform 90 having an opening 92 in the outer wall 94 which allows for insertion of a supporting tool (not shown) to support the bottom 96 during forming of the blow molded container.

FIG. 10, as previously described, illustrates that the invention provides for a plurality of three or more compartments wherein the inner compartment is surrounded by more than one outer compartment. The multiple walls provide for increased bearing strength for a given amount of material and/or provide plural compartments for containing different materials and maintaining the materials separate from each other. The materials may be, for example, differing barrier materials in the form of liquids or gases, or may be materials that can later be combined and mixed together, if desired.

From the foregoing descriptions of several forms of different containers, bottles and preforms, it will be understood by those skilled in this art that I have provided unique and improved processes and containers, and that variations therein may be made without departing from the spirit and scope of my invention as defined by the appended claimed subject matter.

I claim:

1. A one-piece, blow-molded container formed from a preform of thermoplastic material and including inner and outer walls spaced along their length and having smooth rounded adjacent end portions; said container having an inner compartment for containing a product therein and an outer compartment substantially enclosing said inner compartment, said inner compartment being formed by said inner wall, and said outer compartment being formed by said outer wall; said inner and outer walls being integrally merged with each other adjacent one end of said container for sealingly enclosing said outer compartment and tapering inwardly for forming a mouth for filling and emptying said inner compartment of said container, wherein said outer compartment contains fluid under pressure and said inner wall is flexible for forming an aerosol container such that said fluid under pressure deforms said inner wall for forcing product from said inner compartment and out through said mouth.

2. A container as defined in claim 1 wherein said container includes a valve disposed within said mouth, and said mouth is closed by said valve through which product can be dispensed.

* * * * *